United States Patent
Dygert et al.

(10) Patent No.: US 7,531,125 B2
(45) Date of Patent: May 12, 2009

(54) BLOW MOLDED WIDE MOUTH PET CONTAINER AND METHOD OF MANUFACTURE

(75) Inventors: Douglas M. Dygert, Olive Branch, MS (US); David A. Brunson, Lee's Summit, MO (US)

(73) Assignee: RING Container Technologies, Oakland, TN (US)

( * ) Notice: Subject to any disclaimer, the term of this patent is extended or adjusted under 35 U.S.C. 154(b) by 836 days.

(21) Appl. No.: 10/647,192

(22) Filed: Aug. 25, 2003

(65) Prior Publication Data

US 2005/0048235 A1    Mar. 3, 2005

(51) Int. Cl.
*B29C 49/06* (2006.01)

(52) U.S. Cl. .............. 264/535; 264/536; 264/537

(58) Field of Classification Search ............. 264/535–7, 264/536, 537
See application file for complete search history.

(56) References Cited

U.S. PATENT DOCUMENTS

| | | | |
|---|---|---|---|
| 3,651,186 A | 3/1972 | Hall | |
| 3,733,309 A | 5/1973 | Wyeth et al. | |
| 4,496,064 A | 1/1985 | Beck et al. | |
| 4,576,843 A | 3/1986 | Beck et al. | |
| 4,618,515 A | 10/1986 | Collette et al. | |
| 4,665,682 A | 5/1987 | Kerins et al. | |
| 4,894,268 A | 1/1990 | Greenwood et al. | |
| 4,948,001 A | 8/1990 | Magly | |
| 5,679,306 A | 10/1997 | Nakajima et al. | |
| 5,762,854 A | 6/1998 | Valyi | |
| 5,804,016 A | 9/1998 | Schmidt et al. | |
| 6,062,408 A | 5/2000 | Beck et al. | |
| 6,105,800 A | 8/2000 | Czesak | |
| 6,126,886 A | 10/2000 | Beck et al. | |
| 6,228,317 B1 * | 5/2001 | Smith et al. | 264/521 |
| 6,237,791 B1 | 5/2001 | Beck et al. | |
| 6,264,050 B1 | 7/2001 | Darr et al. | |
| 6,277,321 B1 | 8/2001 | Vailliencourt et al. | |
| 6,439,413 B1 | 8/2002 | Prevot et al. | |
| 6,471,909 B1 | 10/2002 | Czesak | |
| 6,841,117 B1 * | 1/2005 | Smith et al. | 264/535 |
| 7,138,082 B2 * | 11/2006 | Nahill et al. | 264/533 |

* cited by examiner

*Primary Examiner*—Suzanne E. McDowell
(74) *Attorney, Agent, or Firm*—Sughrue Mion, PLLC

(57) ABSTRACT

A method of making a wide mouth, blow molded PET plastic container having an externally threaded neck, the diameter and wall thickness of the neck and threads have a critical relationship to the diameter and wall thickness of the preform used to blow the intermediate article of which the container is a part. A PET plastic container having a threaded neck with a wall thickness of within the range of 0.032 to 0.038 inches.

10 Claims, 3 Drawing Sheets

BLOW MOLDED WIDE MOUTH PET CONTAINER AND METHOD OF MANUFACTURE

BACKGROUND OF THE INVENTION

This invention relates generally to blow molded wide-mouth polyethylene terephythalate (PET) plastic containers, and more particularly to such containers having a threaded neck.

Wide mouth PET bottles having threaded necks typically have neck finishes larger than 48 mm in diameter, and the majority of those bottles are produced on single stage injection mold equipment. This equipment is well suited for low volume applications primarily because the slower injection process is the determining factor in cycle time. For high volume applications two-stage PET equipment has been developed to make preforms having the desired finished threaded neck configuration in a separate injection molding machine and then reheating and blowing the preforms in another blowing machine. However, in this arrangement the blowing machine can out-produce the injection machine and preform inventories must be carefully monitored to keep an adequate supply for the blowing machine. This imbalance is compounded when two-stage equipment is used in wide mouth applications. This is primarily due to the size of the preform/neck finish and the physical size of the injection mold.

To overcome those problems in producing wide mouth threaded neck bottles in large volumes for particular use in cold fill applications, we decided to try to use narrow neck preforms to blow the neck finish using the process generally illustrated in U.S. Pat. Nos. 4,496,064, 4,894,268 and 6,228,317. In such a process a standard narrow neck preform is blow molded to form an intermediate article which includes a lower portion in the configuration of the desired bottle with threaded neck and an upper accommodation or dome portion. The dome portion is subsequently removed to provide the finished bottle. However, because of the strain hardening characteristics of PET, it was difficult to get the smaller diameter preform material to blow out and form acceptable, useable neck finish threads on cold fillable containers for a viscous product such as mayonnaise.

Accordingly, the wide mouth PET container and its method of manufacture described below were developed to overcome the those problems.

SUMMARY OF THE INVENTION

The primary object of this invention is to provide a blow-molded wide mouth PET container having an acceptable, useable threaded neck finish.

Another object of the invention is to provide the above container wherein the wall thickness of the threads lies within the range of 0.032-0.038 inches.

Another object of the invention is to provide the above container wherein the thickness of the wall portion of the preform from which the threaded neck is formed lies within the range of 0.1555-0.1790.

Another object of the invention is to provide the above container wherein the ratio of the thickness of the wall portion of the preform from which the threaded neck is formed to the wall thickness of the threaded neck is approximately 4.711.

Another object of the invention is to provide the above container wherein the profile or shape of the threads is such that the threads will aggressively mate with the corresponding threads on a cap to provide acceptable closure seal performance.

A further object of the invention is to provide a novel method of blow molding the above wide mouth container by first providing a narrow neck preform having a predetermined wall thickness in a region from which the threaded neck is to be formed, blowing the preform to form an intermediate article which includes a lower portion in the configuration of the desired bottle with threaded neck and an upper accommodation or dome portion which is subsequently removed to provide the finished bottle.

Other objects and advantages of the invention will become apparent from reading the following detailed description of the invention, with reference to the accompanying drawings wherein like numerals indicate like elements.

DETAILED DESCRIPTION OF THE INVENTION

Figure 3:
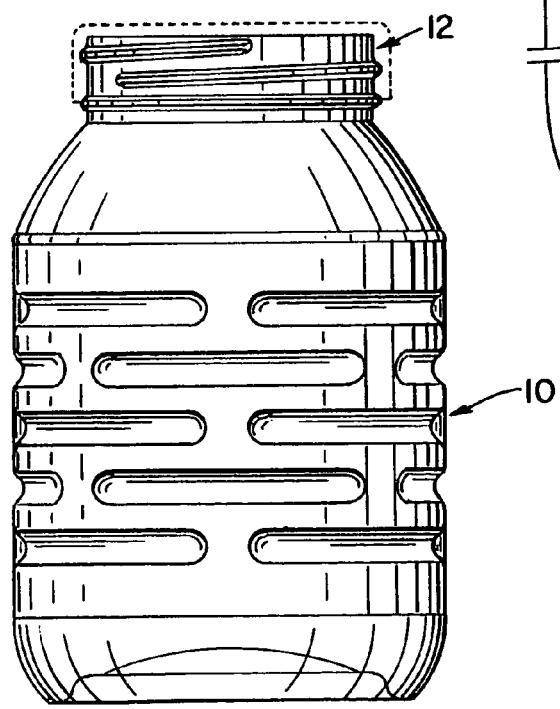
FIG. 3 is a front elevational view of the finished container.
Figure 4:
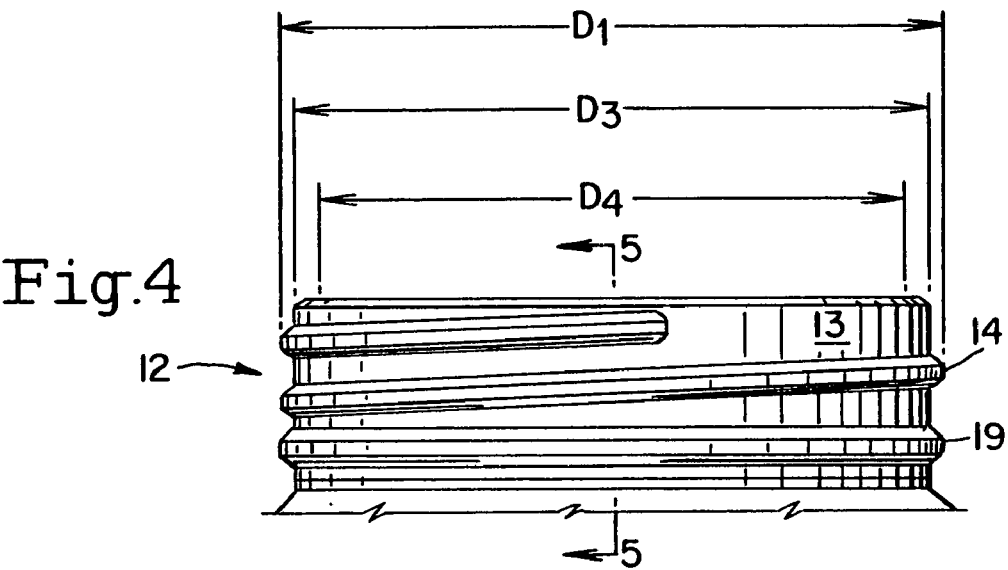
FIG. 4 is a fragmentary elevational view of the threaded neck portion of the container enlarged to about 1 ¼ its actual size.
Figure 5:
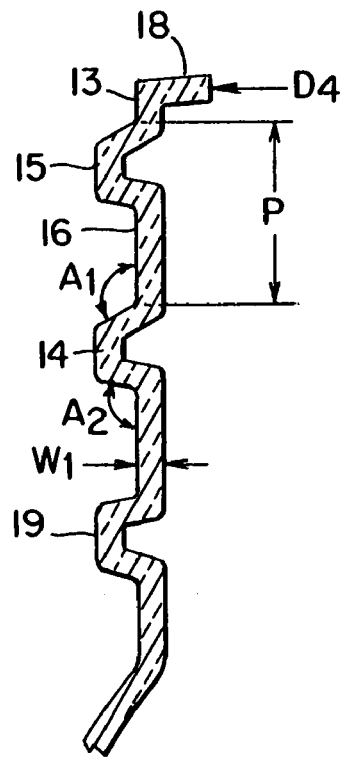
FIG. 5 is a fragmentary cross section of the threaded neck portion taken along line 5-5 of FIG. 4.

Referring to the drawings, a PET blow molded wide mouth cylindrical container 10 constructed according to the invention is illustrated in FIG. 3. In particular, it will be described with respect to a 32 oz. bottle for use with mayonnaise having cylindrical threaded neck configuration 12 as shown in FIGS. 4 and 5 wherein the outer diameter of the continuous thread 14 is about 70 mm or 2.750 inches.

Figure 1:
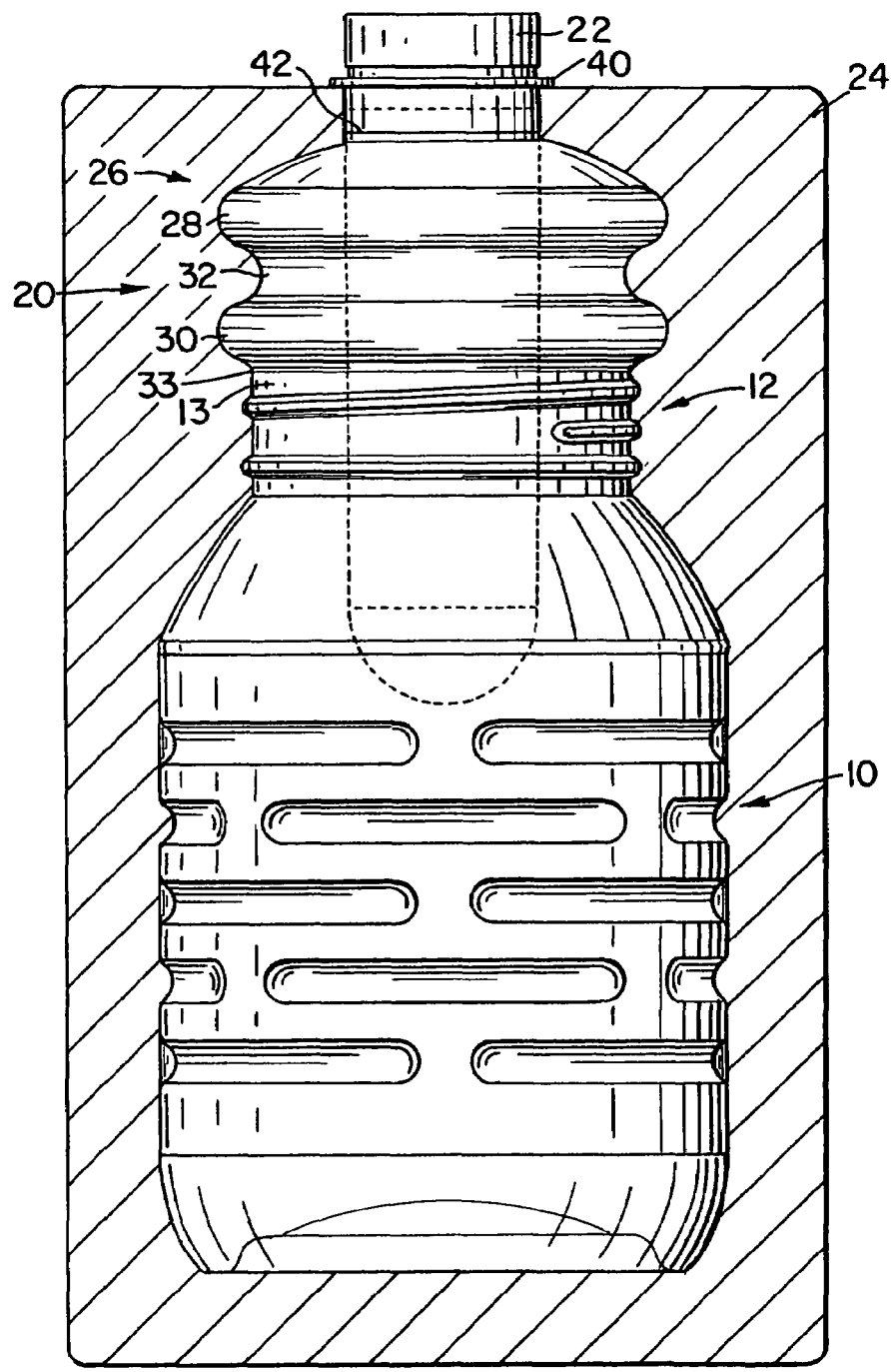
FIG. 1 is a schematic longitudinal partially sectioned view of a blown intermediate cylindrical article within a split mold, with a narrow neck preform shown in dotted lines as it is initially mounted within the mold prior to blowing. The mold, article, and preform are shown at about ¾ actual size.

In conventional fashion, bottle 10 is produced as the lower part of an intermediate article 20 (FIG. 1). To form article 20 a small diameter preform 22 (FIG. 2), preheated to temperature of about 102° C., is mounted in place within the cavity of split mold assembly 24 which has an interior mold surface shaped to correspond to the desired configuration of container 10. The temperature of mold assembly is less than 60° F., preferably within the range of about 43°-48° F.

Blow air at a temperature of about 31° F. from a dryer and a pressure within the range of 10-30 Bar is blown into the top open end of preform 22 to stretch or extend the side walls and bottom of the preform radially outwardly and axially downwardly against the interior molding surface of assembly 24 as shown in FIG. 1. The blow air time may lie within the range of 0.08 seconds to 1.90 seconds.

Intermediate article 20 also includes an upper dome portion 26 with axially spaced upper and lower flanges 28 and 30 that form therebetween a belt engaging groove 32. Dome 26 is attached to the upper edge of neck 13 along an annular recess 33 at which it is subsequently severed from neck 12 to produce bottle 10 of FIG. 3.

As mentioned above, because of the strain hardening characteristics of PET, it was difficult to successfully get a smaller diameter preform to blow out and form useable threads on neck 12. It was determined that the plastic thickness in the neck and thread and the shape profile of the thread itself is critical to get the threads to form properly on a container for a cold fillable product. With this in mind the preform 22 (FIG. 2) had to be designed to achieve the correct wall thickness in the thread area. This was accomplished by designing the wall thickness and diameter of the preform in the region which forms the neck and threads in relation to the same dimensions in the finished bottle neck.

It was found that the wall thickness W1 of the neck and thread has to be 0.035 inches±0.003, preferably on the low side in order to blow acceptable thread definition and neck and thread dimensions. Wall thicknesses greater than or less than this amount tended not to produce a well defined thread profile. This is attributed to either too thick a wall having excessive shrinkage of too thin a wall having the material not to blow completely against the mold surface.

Figure 2:
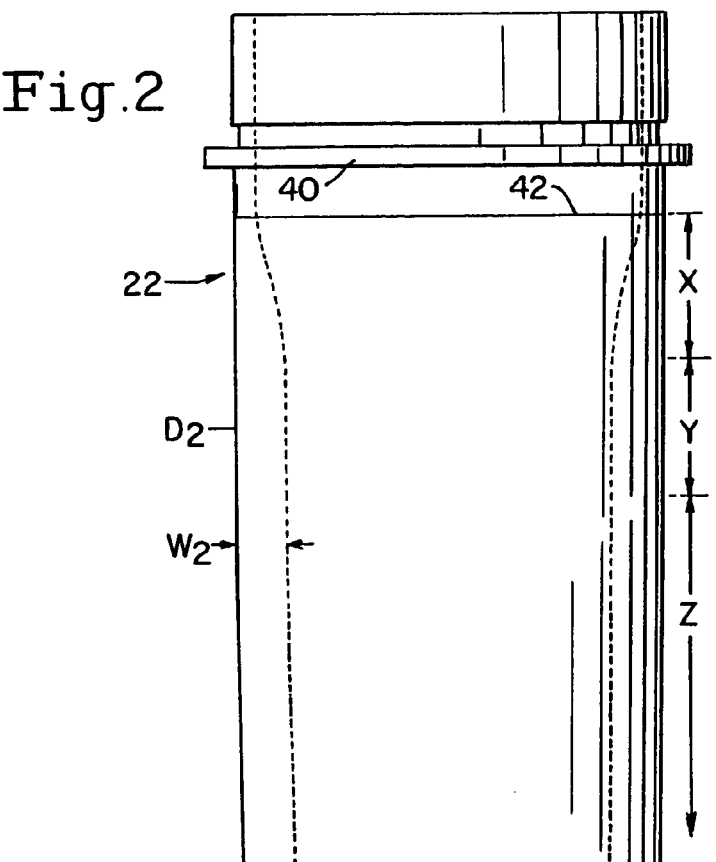
FIG. 2 is a view of the preform of FIG. 1 enlarged to about 1.8 times actual size.

As shown in FIGS. 1 and 2, preform 22 has a flange 40 which mounts on mold 24, a split line 42, a side wall region X which forms dome 26, region Y which forms threaded neck 12, and region Z which forms the main body of container 10. In order to produce the acceptable wall thickness W1 it was determined that the ratio of the wall thickness W2 of region Y to W1 has to be about 4.71 and that the ratio of the diameter D2 of region Y to the diameter D1 of the threads 14 has to be 0.500 inches±0.005. Thus, in producing a 70 mm container wherein the outer diameter D1 of the thread is 2.750 inches and W1 is 0.035 inches, the diameter D2 is 1.376 inches and wall thickness W2 is 0.1649.

It was also determined that the shape profile of the thread is equally important in making a container with a "robust and aggressive" enough thread for the corresponding cap thread to mate with. Threads that are too rounded in shape do not allow the cap torques to reach high enough values and give appropriate downward force to achieve acceptable closure seal performance. Critical to proper thread form is the relationship between the thread root and crest heights as well as the top and bottom angles of the thread.

As shown in FIGS. 4 and 5, neck configuration 12 includes cylindrical neck 13 having outer diameter D3, and continuous thread 14 having outer diameter D1 and a circular bead 19 at the base of the thread formed on neck 13. An annular sealing flange 18 extends inwardly and upwardly at an angle of about 5° from the upper edge of neck 13 and defines an opening having a diameter D4 permitting access to the product within container 10. For the 70 mm bottle, D1 is about 2.750 inches, D3 is about 2.635 inches, and D4 is 2.431 inches. The diameter of bead 16 is about 2.750 inches.

The pitch P for thread 14 is about 0.250 inches. The top or crest 15 of the thread is flattened to be parallel to the toot 16 formed by the outer surface of neck 13. The top of thread 14 extends outwardly and downwardly from the outer surface of neck 13 at an angle A1 of about 150° while the bottom of thread 14 extends outwardly and upwardly from neck 13 at an angle A2 of about 100°. The depth of the thread from root 16 to crest 15 is 0.0575. This particular configuration provides a very robust, and secure thread to which a cap having mating thread structure may reliably bind and seal.

From the above description, it is apparent that the invention overcomes the production problems and limitations associated with prior injection molding processes of wide mouth containers. It also enables wide-mouth containers with threaded necks to be successfully produced from small diameter preforms by the stretch blow-molding process, the resulting containers having thinner, lighter neck finishes with a robust thread design that works with a standard industry cap.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. A method of making a blow-molded PET plastic container having an externally threaded wide-mouth finish, comprising:
    mounting a preform in a mold having a surface, the preform having a body forming region, a thread forming region above the body forming region, and a dome forming region above the thread forming region;
    stretching the preform against the mold surface to form an intermediate article having a dome portion connected to a threaded neck portion of the container; and
    severing the dome portion from the threaded neck portion to produce a wide mouth container, wherein the ratio of a wall thickness of the thread forming region of the preform to the wall thickness of the threaded neck portion is about 4.74.

2. The method of claim 1, wherein the ratio of the diameter of the thread forming region of the preform to the diameter of the finished threads is approximately 0.500+/−0.005.

3. The method of claim 1, wherein the preform is preheated.

4. The method of claim 1, wherein the temperature of the mold surface is less than 60.degree.F.

5. The method of claim 1, wherein a thickness of a wall portion of the thread forming region of the preform is within the range of 0.1555-0.1790 inches.

6. The method of claim 1, wherein a depth of a thread on the threaded neck portion from root to crest is 0.0575 inches.

7. A method of making a blow-molded PET plastic container having an externally threaded wide-mouth finish, comprising:
    mounting a preform in a mold having a surface, the preform having a body forming region, a thread forming region above the body forming region, and a dome forming region above the thread forming region;
    stretching the preform against the mold surface to form an intermediate article having a dome portion connected to a threaded neck portion of the container, a wall thickness of the threaded neck portion being within the range of 0.032-0.038 inches; and
    severing the dome portion from the threaded neck portion to produce a wide mouth container,
    wherein the ratio of the diameter of the thread forming region of the preform to the diameter of the finished threads is approximately 0.500+/−0.005.

8. A method of making a blow-molded PET plastic container having an externally threaded wide-mouth finish, comprising:
    mounting a preform in a mold having a surface, the preform having a body forming region, a thread forming region above the body forming region, and a dome forming region above the thread forming region;
    stretching the preform against the mold surface to form an intermediate article having a dome portion connected to a threaded neck portion of the container, a wall thickness of the threaded neck portion being within the range of 0.032-0.038 inches; and
    severing the dome portion from the threaded neck portion to produce a wide mouth container,
    wherein the crest of the thread is flattened, the upper surface of the thread extends downwardly toward the outer surface of the neck at an angle of about 150.degree. and the lower surface of the thread extends upwardly toward the outer surface of the neck at an angle of about 100.degree., the depth of the thread being about 0.057 inches.

9. A method of making a blow-molded PET plastic container having an externally threaded wide-mouth finish, comprising:

mounting a preform in a mold having a surface, the preform having a body forming region, a thread forming region above the body forming region, and a dome forming region above the thread forming region, a thickness of a wall portion of the thread forming region of the preform is within the range of 0.1555-0.1790 inches;

stretching the preform against the mold surface to form an intermediate article having a dome portion connected to a threaded neck portion of the container; and severing the dome portion from the threaded neck portion to produce a wide mouth container, wherein the wall thickness of the threaded neck portion ranges from 0.032-0.038 inches.

10. The method of claim 9, wherein a depth of a thread on the threaded neck portion from root to crest is 0.0575 inches.

* * * * *